US009646168B2

(12) United States Patent
Park et al.

(10) Patent No.: US 9,646,168 B2
(45) Date of Patent: May 9, 2017

(54) DATA ACCESS CONTROL METHOD IN CLOUD

(71) Applicant: ELECTRONICS AND TELECOMMUNICATIONS RESEARCH INSTITUTE, Daejeon (KR)

(72) Inventors: Jae Min Park, Daejeon (KR); Eunchan Kim, Daejeon (KR); Tae Min Ahn, Daejeon (KR); Cheol Oh Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 40 days.

(21) Appl. No.: 14/743,162

(22) Filed: Jun. 18, 2015

(65) Prior Publication Data

US 2016/0055347 A1     Feb. 25, 2016

(30) Foreign Application Priority Data

Aug. 19, 2014 (KR) .................. 10-2014-0107887

(51) Int. Cl.
*G06F 21/62*     (2013.01)
*G06F 21/60*     (2013.01)
(Continued)

(52) U.S. Cl.
CPC ........ *G06F 21/6218* (2013.01); *G06F 21/602* (2013.01); *H04L 9/0825* (2013.01); *H04L 9/3073* (2013.01)

(58) Field of Classification Search
CPC .................................................. G06F 21/6218
See application file for complete search history.

(56) References Cited

U.S. PATENT DOCUMENTS 8,977,572 B2 *  3/2015  Herlitz .................. G06F 19/322
                                                                    705/51
2014/0052985 A1 *  2/2014  Yang ................... H04L 63/0428
                                                                   713/168

(Continued)

FOREIGN PATENT DOCUMENTS

| KR | 10-1220160 B1 | 1/2013 |  |
|----|---------------|--------|--|
| KR | 10-2014-0033573 A | 3/2014 |  |
| WO | WO 2011045723 A1 * | 4/2011 | ........... H04L 9/3073 |

OTHER PUBLICATIONS

Yi-Mu Ji et al., "A Privacy Protection Method based on CP-ABE and KP-ABE for Cloud Computing," Journal of Software, vol. 9, No. 6, Jun. 2014.

(Continued)

*Primary Examiner* — Kambiz Zand
*Assistant Examiner* — Thanh Le
(74) *Attorney, Agent, or Firm* — LRK Patent Law Firm

(57) ABSTRACT

A data access control method includes requesting, by the data owner unit, the generation of a data encryption key (DEK) from the manager unit, generating, by the manager unit, the DEK, generating, by the manager unit, the result of the Ciphertext Policy-Attribute Based Encryption (CP-ABE) of the DEK and a secret key used to decrypt the result of the CP-ABE encryption, and then responding, by the manager unit, to the data owner unit, obtaining, by the data owner unit, the DEK by performing the CP-ABE decryption of the result of the CP-ABE encryption using the secret key, encrypting, by the data owner unit, data with the obtained DEK, and uploading, by the data owner unit, the encrypted data and DEK information to the cloud.

18 Claims, 5 Drawing Sheets

(51) Int. Cl.
*H04L 9/08* (2006.01)
*H04L 9/30* (2006.01)

(56) References Cited

U.S. PATENT DOCUMENTS

2014/0075184 A1* 3/2014 Gorbach ................ H04L 63/06
 713/155
2015/0222606 A1* 8/2015 Yan ...................... H04L 9/0847
 713/171

OTHER PUBLICATIONS

Shucheng Yu et al., "Achieving Secure, Scalable, and Fine-grained Data Access Control in Cloud Computing," IEEE INFOCOM, 2010.
Piotr K. Tysowski et al., "Hybrid Attribute- and Re-Encryption-Based Key Management for Secure and Scalable Mobile Applications in Clouds," IEEE Transaction on Cloud Computing, vol. 1, No. 2, Jul.-Dec. 2013.

* cited by examiner

DATA ACCESS CONTROL METHOD IN CLOUD

CROSS-REFERENCE TO RELATED APPLICATION

This application claims the benefit of Korean Patent Application No. 10-2014-0107887, filed Aug. 19, 2014, which is hereby incorporated by reference herein in its entirety.

BACKGROUND

1. Technical Field

The present disclosure relates generally to a data access control method in cloud computing and, more particularly, to a data access control method using Ciphertext Policy-Attribute Based Encryption (CP-ABE).

2. Description of the Related Art

A cloud computing system (hereinafter referred to as a "cloud") is a new innovative model of distributed computing that is composed of a centralized data center.

A cloud provides high expandability and stability. That is, client devices having limited resources delegate (offload) a required data storage space and the function of computing corresponding data to a cloud. Through this, data itself or the result of the computation of the corresponding data stored in the cloud may be shared by other users. Accordingly, users can use a high-capacity and highly-efficient computing function at low cost.

However, since the data of users is stored, processed and shared within a cloud, measures for security and privacy protection should be taken. That is, since the cloud can access stored user data without the intervention of the users, measures for privacy protection should be taken.

To perform such privacy protection, a data owner may encrypt and store data to be uploaded to the cloud. Furthermore, to control access to data stored via encryption, recently, Key Policy (KP)-Attribute-Based Encryption (ABE) and Ciphertext-Policy (CP)-ABE to which ABE has been extended are widely being used.

ABE is a public key cryptographic algorithm to which IBE, which uses the identification information of an entity as the public key of a corresponding entity without using a certificate, has been extended. According to ABE, data encrypted using a specific attribute set as a public key may be decrypted using an entity having an attribute set whose intersection with respect to a corresponding attribute set exceeds a specific threshold value. ABE operates based on a bilinear group and a bilinear map.

In the 2000s, KP-ABE and CP-ABE, i.e., extended versions of ABE, were proposed in 2006 and 2007, respectively. Various methods of controlling access to the data of a cloud have been proposed.

Data access policies that are described by KP-ABE and CP-ABE in common are represented by an access tree composed of leaf nodes representative of attributes and intermediate nodes representative of AND or OR gates. In KP-ABE, the result of the encryption of specific data is represented by a specific attribute set, and an access tree is applied to a key used to decrypt the corresponding encrypted data. In contrast, in CP-ABE, an access tree is used to encrypt specific data and an attribute set is used to represent a key used to decrypt the corresponding encryption data.

That is, in KP-ABE, a single piece of encrypted data is decrypted using various scenarios and users. In contrast, in CP-ABE, a single user can decrypt various pieces of data according to his or her attribute.

As a related technology, "Achieving Secure, Scalable, and Fine-grained Data Access Control in Cloud Computing" (hereinafter referred to as "related technology 1") published on IEEE INFOCOM in 2010 discloses a technology in which a data owner encrypts a data file with a Data Encryption Key (DEK). Furthermore, related technology 1 adds the result of the KP-ABE encryption of a DEK and the ID of the data file to the header of the encrypted data file and stores the resulting data in a cloud. Furthermore, in related technology 1, whenever a user attempts to access a corresponding encryption file, a data owner generates and transfers a secret key that is used when a corresponding user decrypts a DEK encrypted through KP-ABE. Furthermore, in related technology 1, a user obtains a DEK by performing KP-ABE decryption of the DEK using a received secret key, and then decrypts a data file. Additionally, in related technology 1, upon the revocation of a user, the result of the KP-ABE encryption of a DEK accessed by the corresponding user is delegated to a cloud via a re-encryption proxy method, thereby reducing the computational overhead of the data owner.

However, since a DEK itself is not updated upon the revocation of a user, data files encrypted with the same DEK and stored for a long period may be vulnerable in terms of security. Furthermore, a vulnerable point in which, when the user subjected to revocation colludes with the cloud, the user can recover the DEK encrypted through KP-ABE. Furthermore, whenever a new user is added, the data owner should generate and transmit a secret key for the corresponding user, and thus overhead is considerably large.

As another related technology, "Hybrid Attribute- and Re-Encryption-Based Key Management for Secure and Scalable Mobile Applications in Clouds" (hereinafter referred to as "related technology 2") published on IEEE Transaction on Cloud Computing in 2013 employs CP-ABE. In related technology 2, a secret key generation process for a user that is performed by a data owner in the case of related technology 1 is performed by the data owner and a manager, i.e., a reliable entity, and pairing computation that causes considerable overhead in CP-ABE computation is performed by the manager and a cloud, with the result that related technology 2 is appropriate to a mobile cloud computing (MCC) environment. Furthermore, in related technology 2, whether to access data can be determined based on the possession of a specific attribute or belonging to a specific group via a group key. Based on this, in related technology 2, when a user who belongs to a specific group is subjected to revocation, a corresponding group key is updated, and data encrypted with a previous group key is encrypted with a group key updated by the cloud through proxy re-encryption.

However, related technology 2 has limitations in that the update of a DEK itself is not addressed therein and the target of the update of a CP-ABE encryption result attributable to the revocation of a user is limited in connection with belonging to a specific group.

As still another related technology, Korean Patent No 1220160 (entitled "Safe Proxy Re-encryption-based Data Management Method in Mobile Cloud Environment") (hereinafter referred to as "related technology 3") discloses a technology that performs data access control in a cloud environment in the same structure as above-described related technology 1. In this case, in related technology 3, a data owner transmits a file header, including the result of the encryption of a DEK using KP-ABE, to an authority administrator. Furthermore, a data file body encrypted with a corresponding DEK is transmitted to a cloud, and the header and body of an encrypted data file are separated and managed. Furthermore, in related technology 3, secret distribution and type-based proxy re-encryption are used to verify the legitimacy of user access. Through this, in related technology 3, the vulnerability to a collusion attack in the above-described related technology 1 is mitigated. However, related technology 3 does not overcome the issue of the overhead of a data owner, attributable to the generation of a KP-ABE secret key, and the issue of the update of a DEK itself.

SUMMARY

At least one embodiment of the present invention is directed to the provision of a CP-ABE-based efficient data access control method using a manager, i.e., a reliable and trusted entity in cloud computing.

In other words, at least one embodiment of the present invention is directed to the provision of a technology in which a manager generates a data encryption key (DEK) on behalf of a data owner and generates a secret key (SK) for CP-ABE-based encryption and decryption.

At least one embodiment of the present invention is directed to the provision of a technology in which a data owner encrypts data using a DEK obtained from a manager and shares the encrypted data within a cloud.

At least one embodiment of the present invention is directed to the provision of a technology in which a data owner requests policy update from a manager when DEK access policies are changed and a manager intends to update policies by performing CP-ABE encryption on a DEK based on new access policies.

At least one embodiment of the present invention is directed to the provision of a technology in which a user intends to access the encrypted data of a cloud, to request a DEK, used to access corresponding data and encrypted through CP-ABE, from a manager, and to request and obtain a SK used to decrypt the encrypted DEK.

At least one embodiment of the present invention is directed to the provision of a technology in which a user intends to decrypt a DEK obtained via a manager and encrypted through CP-ABE using the DEK and a SK, and to encrypt and access desired data.

At least one embodiment of the present invention is directed to the provision of a technology in which, when DEK update is required due to the revocation of a user or the changes of security policies, a manager intends to update a corresponding DEK with a new key, perform CP-ABE encryption and key version update, access a cloud, and re encrypt data, encrypted with a previous DEK, with a new DEK.

At least one embodiment of the present invention is directed to the provision of a technology in which a manager intends to notify a data owner, which is influenced by an updated DEK, of an updated DEK list.

At least one embodiment of the present invention is directed to the provision of a technology in which a manager updates data encrypted with a new DEK with key version information, thereby allowing a user to determine whether a DEK has been updated using corresponding information.

In accordance with an aspect of the present invention, there is provided a data access control method in which a data owner unit, a manager unit and a cloud perform data access control in conjunction with one another in cloud computing, the method including requesting, by the data owner unit, the generation of a data encryption key (DEK) from the manager unit; generating, by the manager unit, the DEK; generating, by the manager unit, the result of the Ciphertext Policy-Attribute Based Encryption (CP-ABE) of the DEK and a SK used to decrypt the result of the CP-ABE encryption, and then responding, by the manager unit, to the data owner unit; obtaining, by the data owner unit, the DEK by performing the CP-ABE decryption of the result of the CP-ABE encryption using the SK; encrypting, by the data owner unit, data with the obtained DEK; and uploading, by the data owner unit, the encrypted data and DEK information to the cloud.

Requesting the generation of the DEK from the manager unit may include requesting the generation of the DEK by transmitting access policy information to be applied to the DEK, and the attribute set and identification (ID) of the data owner unit to the manager unit.

Responding to the data owner unit may include: generating the result of the CP-ABE encryption, the SK, and the ID of the DEK using an access tree related to the access policy information; and providing the ID of the DEK, the result of the CP-ABE encryption, and the SK to the data owner unit.

Responding to the data owner unit may include storing, by the manager unit, the ID of the data owner unit, the result of the CP-ABE encryption, and the ID of the DEK in the key storage unit.

Requesting the generation of the DEK from the manager unit may include, if access policies related to a previously generated DEK are intended to be changed, additionally including the ID of the DEK to be changed and transmitting the ID of the DEK to the manager unit.

The manager unit, when the ID of the DEK to be changed is received, may generate a new access tree through the changing of the access policy information, and re-performs the CP-ABE encryption using the new access tree.

The manager unit may store the ID of the data owner unit, the result of the re-performance of the CP-ABE encryption, and the ID of the DEK in the key storage unit.

The DEK information may include the ID of the DEK, and the version information of the corresponding DEK included in the result of the CP-ABE re-encryption.

The data access control method may further include, before requesting the generation of the DEK from the manager unit, generating, by the manager unit, a public key and a master key by performing the setup algorithm of CP-ABE.

The data access control method may further include updating, by the manager unit, the DEK.

Updating the DEK may include: detecting a key update event; obtaining a key update target DEK ID list from a key storage unit; generating a new DEK based on the DEK ID list; accessing the cloud, and obtaining encrypted data using a DEK of the DEK ID list; performing the CP-ABE decryption of the encrypted data using the data encryption key existing before the new DEK, and encrypting the decrypted data using the new DEK; and uploading the encrypted data to the cloud.

The key update event may be the changes of security policies or the revocation of a user.

When the key update event is the revocation of the user, obtaining the key update target DEK ID list may include registering a corresponding user in a blacklist and then obtaining a DEK ID list, used by the corresponding user, from the key storage unit.

The data access control method may further include, between generating the new DEK and obtaining the data encrypted using the DEK of the DEK ID list: obtaining the result of new CP-ABE encryption by performing the CP-ABE encryption of the new DEK; and updating DEK version information included in the result of the new CP-ABE encryption.

Uploading the encrypted data to the cloud may include uploading the updated DEK version information, together with the encrypted data.

Updating the DEK may further include notifying the data owner unit, which is influenced by the updating of the key, of an updated DEK ID list.

In accordance with another aspect of the present invention, there is provided a data access control method in which a manager unit, a user unit and a cloud perform data access control in conjunction with one another in cloud computing, the method including: accessing, by the user unit, the cloud, and obtaining, by the user unit, encrypted data to be accessed and DEK information; requesting, by the user unit, the result of CP-ABE encryption of the DEK ID and a SK used to decrypt the result of the CP-ABE encryption by transferring its ID and attribute set and a DEK ID included in the DEK information to the manager unit; determining, by the manager unit, whether the attribute set of the user unit satisfies an access tree and an ID of the user unit is not included in a blacklist; responding, by the manager unit, to the user unit with the SK and the result of the CP-ABE encryption; obtaining, by the user unit, a DEK through CP-ABE decryption; and decrypting, by the user unit, the encrypted data with the DEK.

The DEK information may include the ID of the DEK, and the version information of the corresponding DEK included in the result of the CP-ABE encryption.

Responding to the user unit with the SK and the result of the CP-ABE encryption may further include storing, by the manager unit, the ID of the user unit and the DEK ID in a key storage unit.

Decrypting the encrypted data using the DEK may further include storing, by the user unit, the DEK ID, used by the user unit, and the version information of the corresponding DEK in a database.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
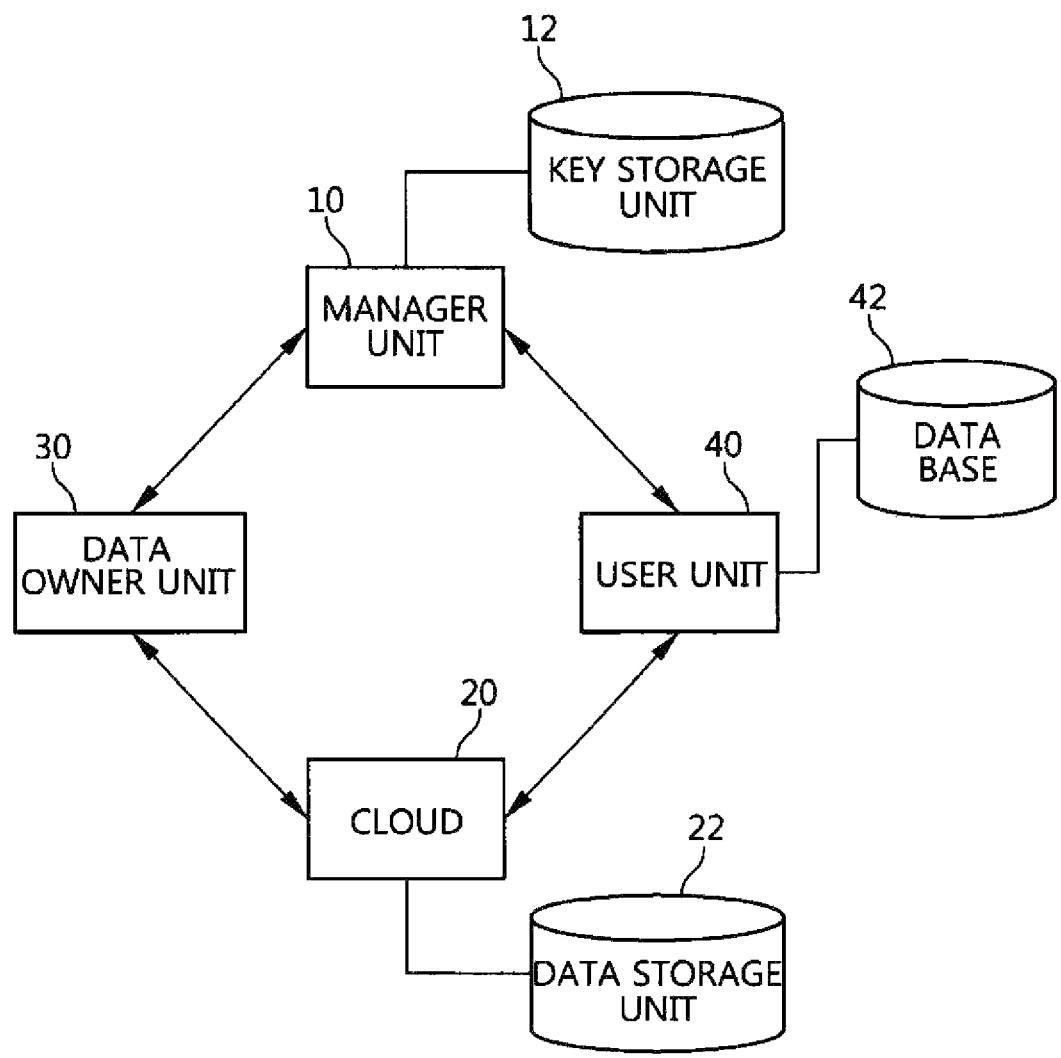
FIG. 1 is a diagram illustrating all the flows of a system to which data access control method according to an embodiment of the present invention is applied.

The present invention may be subjected to various modifications and have various embodiments. Specific embodiments are illustrated in the drawings and described in detail below.

However, it should be understood that the present invention is not intended to be limited to these specific embodiments but is intended to encompass all modifications, equivalents and substitutions that fall within the technical spirit and scope of the present invention.

The terms used herein are used merely to describe embodiments, and not to limit the inventive concept. A singular form may include a plural form, unless otherwise defined. The terms, including "comprise," "includes," "comprising," "including" and their derivatives specify the presence of described shapes, numbers, steps, operations, elements, parts, and/or groups thereof, and do not exclude presence or addition of at least one other shapes, numbers, steps, operations, elements, parts, and/or groups thereof.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Embodiments of the present invention are described in greater detail below with reference to the accompanying drawings. In the following description of the present invention, in order to facilitate the general understanding of the present invention, like reference numerals are assigned to like components throughout the drawings and redundant descriptions of the like components are omitted.

FIG. 1 is a diagram illustrating all the flows of a system (a cloud computing system) to which data access control method according to an embodiment of the present invention is applied.

The system of FIG. 1 includes a manager unit 10, a key storage unit 12, a cloud 20, a data storage unit 22, a data owner unit 30, a user unit 40, and a database (DB) 42.

A manager unit 10 is a reliable entity. The manager unit 10 may be an entity that can be accessed by only the limited user of a single institution or organization, such as a private cloud in a hybrid cloud environment.

The key storage unit 12 stores and manages a set of a data encryption key (DEK), encrypted by the manager unit 10, and DEK information (i.e., an ID, and version information) and a set of the ID of a user, who has requested DEK access, and a DEK ID, with which a response has been made. The key storage unit 12 may be viewed as a database.

The cloud 20 serves as a storage space that is stable and highly expandable. The cloud 20 may be viewed as a public cloud in a hybrid cloud environment.

The data storage unit 22 stores encrypted data and DEK information (i.e., ID, and version information) in conjunction with the cloud 20.

The data owner unit 30 is an entity that attempts to share data via the cloud 20. The data owner unit 30 may include a terminal, such as a personal computer (PC) or the like. The data owner unit 30 requests the generation of a DEK from the manager unit 10, and shares data, encrypted using, a DEK obtained from the manager unit 10, with the cloud 20.

The user unit 40 is an entity that attempts to access the cloud 20 and obtain and use the data encrypted with the DEK. The user unit 40 may include a terminal, such as a PC or the like. In order to determine whether the DEK has been updated, the user unit 40 has a database 42 that stores the DEK used by itself and the version information of the corresponding DEK.

Figure 2:
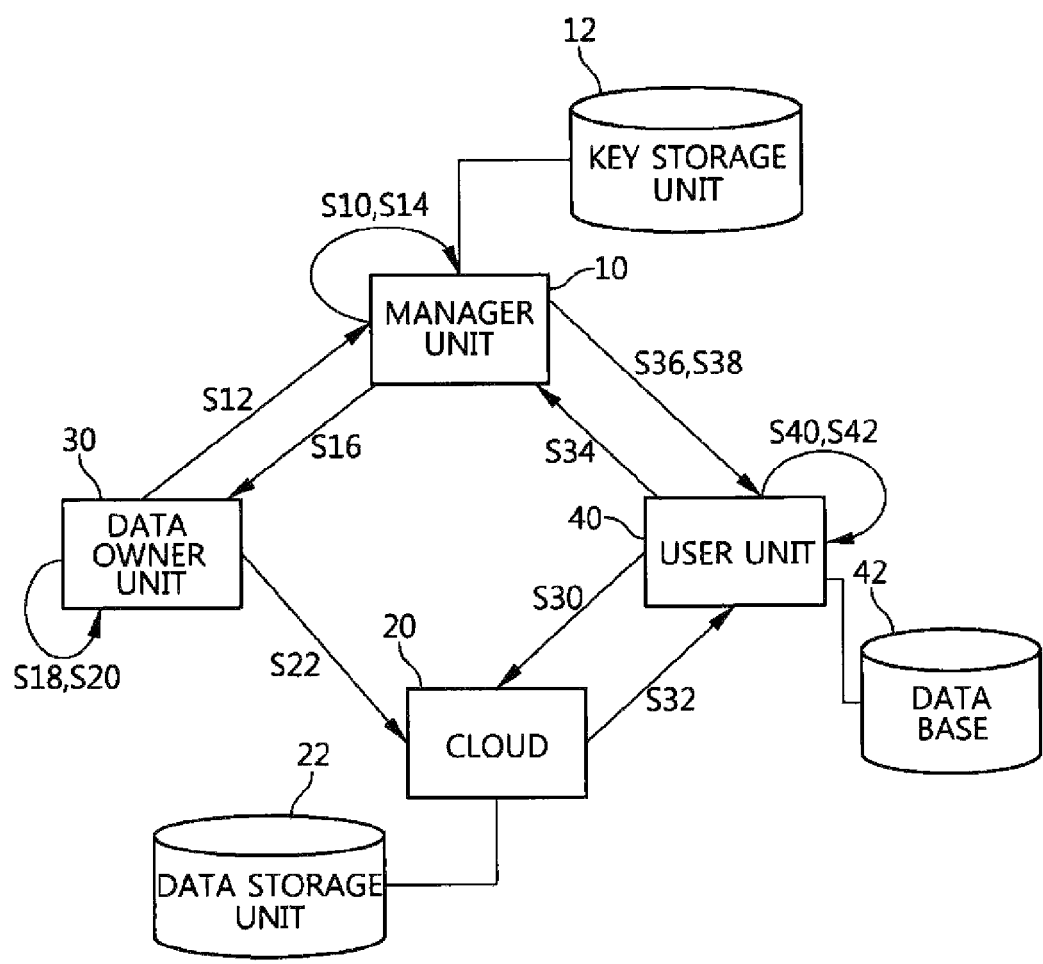
FIG. 2 is a diagram illustrating the flows of the steps of the key generation request of a data owner, the key generation and response of a manager, the data sharing of the data owner, and the data access of a user according to an embodiment of the present invention.
Figure 3:
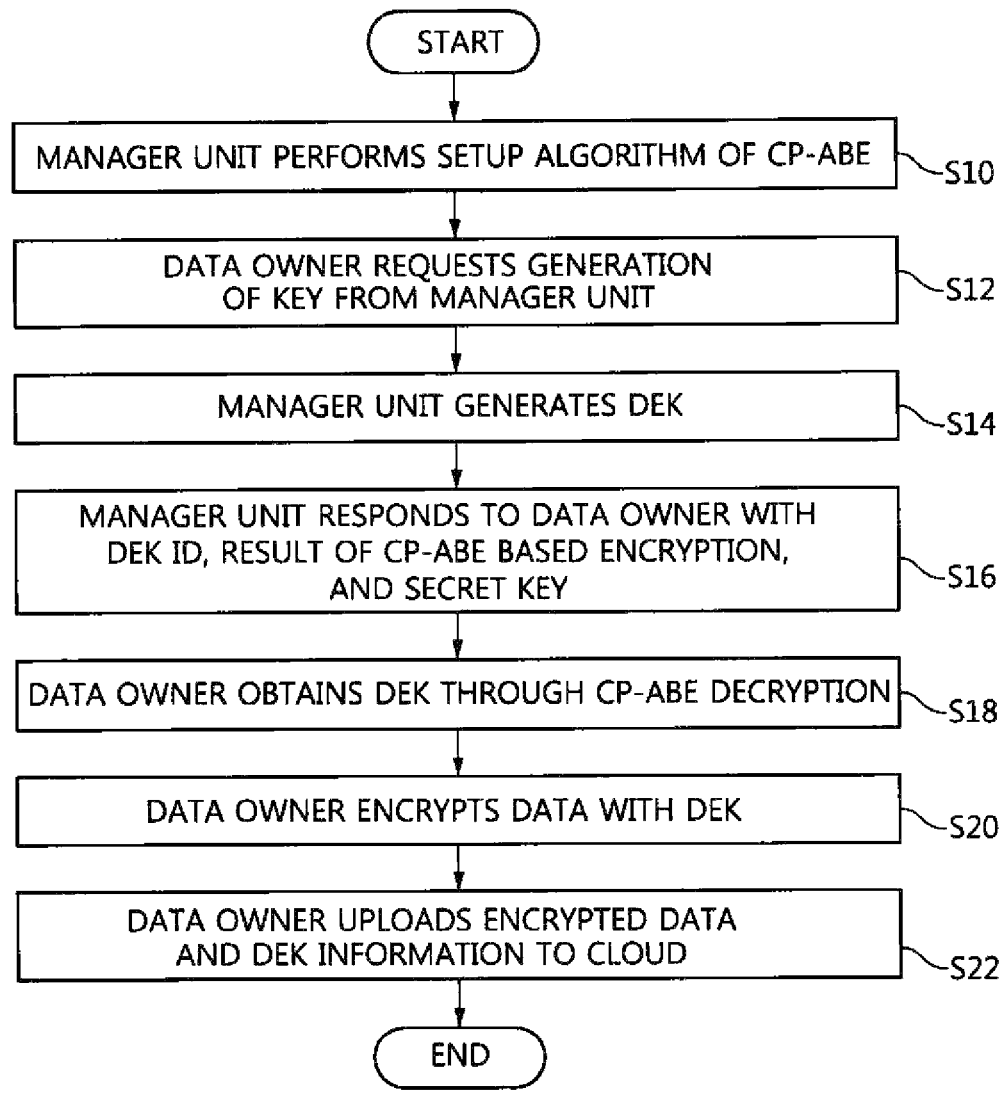
FIG. 3 is a flowchart illustrating steps ranging from the step of performing the setup algorithm of CP-ABE to the step of uploading encrypted data and DEK information to a cloud, which is illustrated in FIG. 2.
Figure 4:
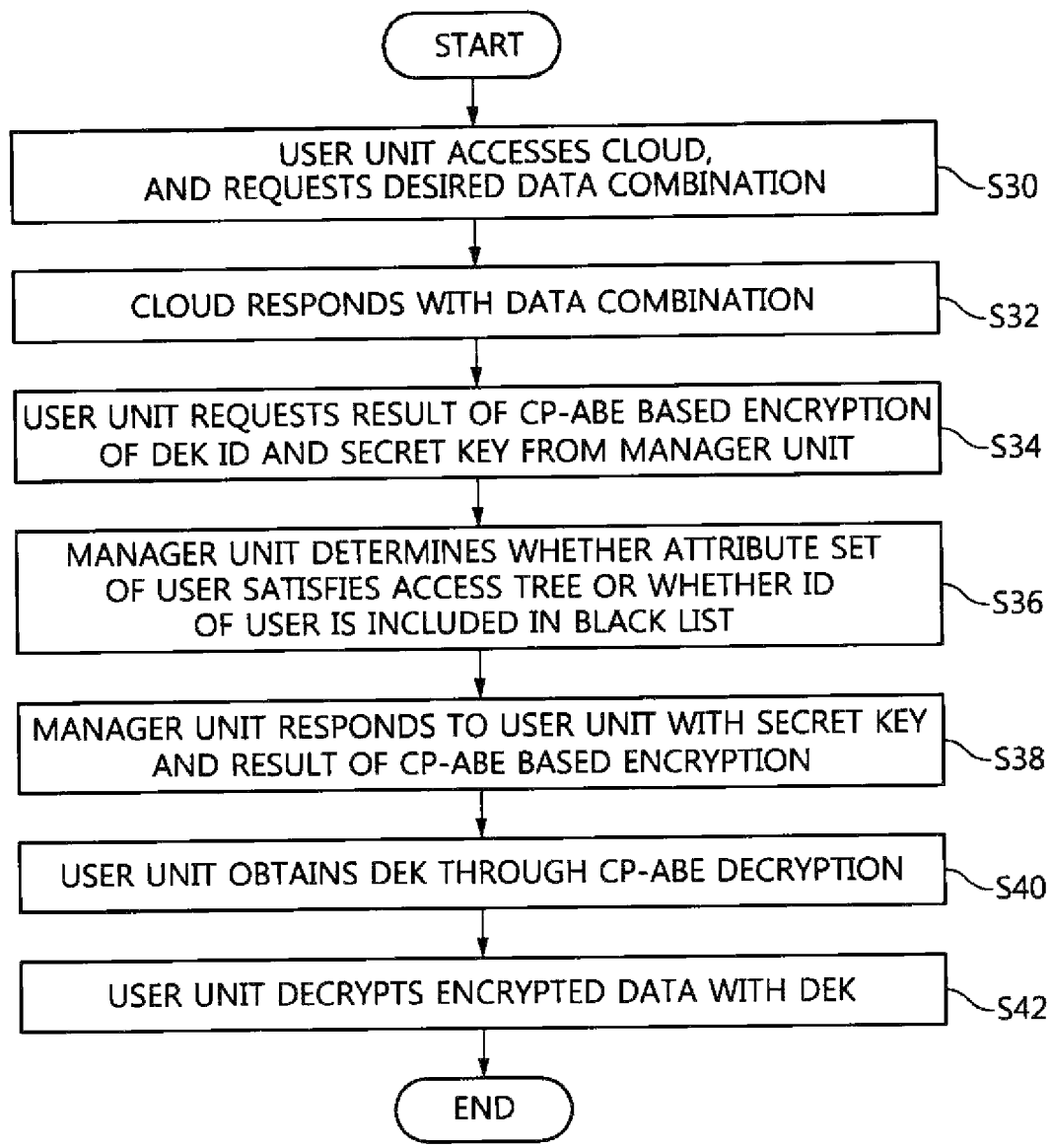
FIG. 4 is a flowchart illustrating steps ranging from the step of requesting a target data combination to the step of decrypting encrypted data, which is illustrated in FIG. 2.

FIG. 2 is a diagram illustrating the flows of the steps of the key generation request of a data owner, the key generation and response of a manager, the data sharing of the data owner, and the data access of a user according to an embodiment of the present invention. FIG. 3 is a flowchart illustrating steps ranging from the step of performing the setup algorithm of CP-ABE to the step of uploading encrypted data and DEK information to a cloud, which is illustrated in FIG. 2. FIG. 4 is a flowchart illustrating steps ranging from the step of requesting a target data combination to the step of decrypting encrypted data, which is illustrated in FIG. 2.

A method of providing confidentiality, integrity and authenticity for information exchanged between entities during the above steps is out of the scope of the present invention, the method is not described in detail.

First, the manager unit 10 performs the setup algorithm of CP-ABE at step S10. In this case, the setup algorithm selects a bilinear group $G_0$ of prime order p and generator g, and selects two random numbers $\alpha, \beta \in Z_0$. Furthermore, the setup algorithm makes pubic public key $PK=G_0, g, h=g^\beta, f=g^{1/\beta}, e(g,g)^\alpha$, and generates master key $MK=(\beta, g^\alpha)$. In this case, h and f are symbols used to simplify the equation, and $G_0$ is a set of integers from 0 to p−1. Furthermore, random numbers $\alpha$ and $\beta$ are often called random exponents because they are used as exponents of specific value g.

Thereafter, the data owner unit 30 makes a request for the generation of a key (i.e., the generation of a DEK) by transmitting access policy information $P_x$ to be applied to the DEK used to encrypt/decrypt data that will be shared within the cloud 20, its own attribute set $I_O$, and its own ID $ID_O$ to the manager unit 10 at step S12. In this case, the data owner unit 30 may include $KeyID_x$, the ID of a previously generated DEK, when attempting to change the access policy related to the target DEK.

The manager unit 10 generates DEL, in response to the key generation request from the data owner unit 30 at step S14.

Thereafter, the manager unit 10 generates access tree $T_x$ using the access policy information $P_x$ with respect to the generated DEK. Furthermore, the manager unit 10 generates the result $CT_x$ of CP-ABE-based encryption using the generated access tree $T_x$, secret key $SK_o$ used to decrypt the result of the CP-ABE-based encryption by the data owner unit 30, and the ID $KeyID_x$ of the corresponding DEK. $KeyID_x$ may be viewed as a DEK ID. Detailed operations and the results of the respective operations may be as shown in Table 1 below, and result value $ID_O, CT_x, KeyID_x$ is stored in the key storage unit 12:

TABLE 1

Generate $DEK_x$ and its $KeyID_x$
$Encrypt(PK, DEK_x, T_x) \Rightarrow CT_x = (v_x, T_x, \tilde{C}_x = DEK_x \cdot e(g,g)^{\alpha s}, C_x = h^s, \forall_y \in Y:$
$C_y = g^{q_y(0)}, C_y^1 = H(att(y))^{q_y(0)})$
In this case, random number s is obtained from $Z_p$.
Y is a set of leaf nodes in $P_x$,
and $q_y$ is a polynomial expression for node y in tree $p_x$.

TABLE 1-continued $KeyGen(MK, I_o) \Rightarrow SK_0 =$ $\left( D = g^{\frac{\alpha+r}{\beta}}, \forall_j \in I_o; D_j = g^r, H(j)^{r_j}, D_j^l = g^{r_j} \right)$ In this case, random number r and $r_j$ are obtained from $Z_p (j \in I_0)$.

$v_x$ is the version information of the DEK, and $\tilde{C}_x$ is a sign used to represent the result of the encryption of the DEK. $h^s$ represents the result of exponentiating h to the power of s, and $\forall_y$ is a mathematical expression representative of "with respect to all attributes y." $C'_y$ is a sign used to simply express an equation. att(y) is a function that returns the attribute of node y. H( ) in $H(att(y))^{q_y(0)}$ refers to a one-way hash function. As a result, $H(att(y))^{q_y(0)}$ is obtained by applying a hash function to att(y) and then exponentiating the result of the application to the power of the value of polynomial expression qy(0) D is a sign used to simply express an equation, and $\forall_j$ is a mathematical expression representative of "with respect to all attributes j" and refers to "with respect to all attributes j" included in attribute set $I_o$.

Meanwhile, when the data owner unit 30 includes $KeyID_x$ indicative of an access policy information change ($_{px} \rightarrow _{Px}^{new}$) at step S12, the manager unit 10 generates $_{Tx}^{new}$ using $_{Px}^{new}$, and then performs $Encrypt(PK, DE_{Kx}, T_x^{new}) \Rightarrow C_{Tx}^{new}$. Thereafter, the manager unit 10 stores result value $IDo, C_{Tx}^{new}, KeyID_x$ in the key storage unit 12. By doing so, the data owner unit 30 can actively change the data access policies.

Thereafter, the manager unit 10 responds to the data owner unit 30 with $KeyID_x, CT_x, SK_o$ generated in the above-described process at step S16.

Accordingly, the data owner unit 30 obtains $DEK_x$ through CP-ABE decryption using $CT_x$ (i.e., the result of the CP-ABE-based encryption using the access tree $T_x$) and $SK_o$ (i.e., a secret key for decryption) received from the manager unit 10 at step S18. In this case, the process of performing CP-ABE decryption is described, as illustrated in Table 2 below:

TABLE 2

Define a recursive algorithm (n is a node from $T_x$)
$DecryptNode(CT_x, SK_0, n) =$ $$\begin{cases} \frac{e(D_i, C_n)}{e(D_i^l, C_n^l)} = \frac{e(g^r, H(i)^{r_i}, h^{q_n(0)})}{e(g^{r_i}, H(i)^{q_n(0)})} = \\ e(g, g)^{r q_n(0)} (\text{if } i = att(n) \in I_0 \perp (\text{if } i = att(n) \notin I_0) \end{cases}$$

If $P_x$ is satisfied by $I_0$, $A = DecryptNode(CT_x, SK_o, r) = e(g,g)^{r q_R(0)} = e(g,g)^{rs}$
(R is the root node of tree $T_x$)

$\tilde{C}_x / (e(C_x, D)/A) = \tilde{C}_x / \left( e\left(h^s, g^{\frac{\alpha+r}{\beta}}\right) / e(g, g)^{rs} \right) = DEK_x$ Furthermore, the data owner unit 30 obtains encrypted data (for example, $\{Data\}_{DEKx}$) by encrypting data using $DEK_x$ at step S20. In this case, the data encryption is generally performed using a block cryptographic algorithm, such as AES.

Thereafter, the data owner unit 30 uploads $\{Data\}_{DEKx}$ (i.e., encrypted data), together with DEK version information $V_x$ included in $KeyID_x$ (i.e., the ID of the DEK to be changed) and $CT_x$ (i.e., the result of CP-ABE-based encryption using the access tree $T_x$), to the cloud 20 at step S22.

Accordingly, the cloud 20 stores data combination KeyID$_x$, {Data}$_{DEKx}$, V$_x$ in the data storage unit 22.

By doing so, the user unit 40 can share the data of the cloud 20.

Accordingly, the user unit 40 accesses the cloud 20 and requests the desired data combination KeyID$_x$, {Data}$_{DEKx}$, V$_x$ at step S30.

Then, the cloud 20 responds to the request from the user unit 40 with the data combination KeyID$_x$, {Data}$_{DEKx}$, V$_x$ at step S32.

The user unit 40 requests CT$_x$ for KeyID$_x$ and a secret key SK$_u$ for the decryption thereof by transferring DEK ID KeyID$_x$ obtained via the cloud 20, its own ID ID$_u$, and attribute set I$_u$ to the manager unit 10 at step S34.

Accordingly, the manager unit 10 determines whether the attribute set I$_u$ of the corresponding user unit 40 satisfies the access tree T$_x$ and the ID ID$_u$ of the corresponding user unit 40 has been included in a black list with respect to the request from the user unit 40 at step S36.

Thereafter, the manager unit 10 responds to the user unit 40 with CT$_x$ (i.e., the result of the CP-ABE-based encryption using the access tree T$_x$), together with secret key SK$_u$ newly generated for the corresponding user unit 40, at step S38. In this case, the manager unit 10 stores ID$_u$, KeyID$_x$ in the key storage unit 12. The detailed process of generating the secret key SK$_u$ may be described, as shown in Table 3 below:

TABLE 3

KeyGen(MK, I$_u$)⇒SK$_u$=

$\left(D = g^{\frac{\alpha+r}{\beta}}, \forall_j \in I_u; D_j = g^r, H(j)^{r_j}, D'_j = g^{r_j}\right)$ where random r and r$_j$ are from $Z_p$(j∈I$_u$)

In this case, D is a sign used to simply express an equation, and $\forall_j$ is a mathematical expression representative of "with respect to all attributes j" and refers to "with respect to all attributes j" included in attribute set I$_u$. Z$_p$ is, a set of integers ranging from 0 to p−1, and D$_j$ is a sign used to simply express an equation. H(j)$^{r_j}$ is obtained by applying a hash function to attribute j and then exponentiating the result of the application to the power of random number r$_j$. j refers to an attribute included in I$_u$.

The user unit 40 decrypts DEK$_x$ through CP-ABE decryption using the secret key SK$_u$ for decryption obtained from the manager unit 10 at step S40.

Furthermore, the user unit 40 decrypts the encrypted data {Data}$_{DEKx}$ using the decrypted DEK$_x$ at step S42.

Since the user unit 40 can decrypt the encrypted data as described above, it can access desired data. Furthermore, the user unit 40 stores the result of the mapping between DEK ID, used by itself, and the version information of the corresponding DEK, that is, KeyID$_x$:V$_x^{local}$, in the database 42. The detailed process of performing CP-ABE decryption may be described, as illustrated in Table 4 below:

TABLE 4

Define a recursive algorithm (n is a node from T$_x$)
DecryptNode(CT$_x$,SK$_u$,n) =

$\left\{\begin{array}{l}\frac{e(D_i, C_n)}{e(D'_i, C'_n)} = \frac{e(g^r, H(i)^{r_i}, h^{q_n(0)})}{e(g^{r_i}, H(i)^{q_n(0)})} = \\ e(g, g)^{rq_n(0)}(\text{if } i = \text{att}(n) \in I_0 \perp (\text{if } i = \text{att}(n) \notin I_0)\end{array}\right\}$ TABLE 4-continued If P$_x$ is satisfied by I$_u$, A=DecryptNode(CT$_x$, SK$_u$, r)=e(g,g)$^{rqR(0)}$=e(g,g)$^{rs}$
(R is the root node of tree T$_x$)

$\tilde{C}_x/(e(C_x,D)/A) = \tilde{C}_x/\left(e(h^s, g^{\frac{\alpha+r}{\beta}})/e(g, g)^{rs}\right) = DEK_x$ In this case, D$_i$, C$_n$, D'$_i$ and C'$_n$ are obtained by substituting node ID n and attribute i belonging to I$_o$ into the above-described D$_j$, C$_x$, D'$_j$ and C'$_x$ equations. A is an equation that simply represents the result of DecryptNode ( ). C$_x$ is an equation that represents C$_x$ that is mentioned in the previous Encrypt. h$^{q_n(0)}$ is obtained by exponentiating the previously mentioned h to the power of the polynomial resulting value q$_n$(0). H(i)$^{r_i}$ is obtained by exponentiating the result of the application of a hash function to attribute i to the power of random number r$_i$. $\tilde{C}_x$ represents $\tilde{C}_x$ that is mentioned in the previously mentioned Encrypt. att(n) refers to the attribute value of node n.

Figure 5:
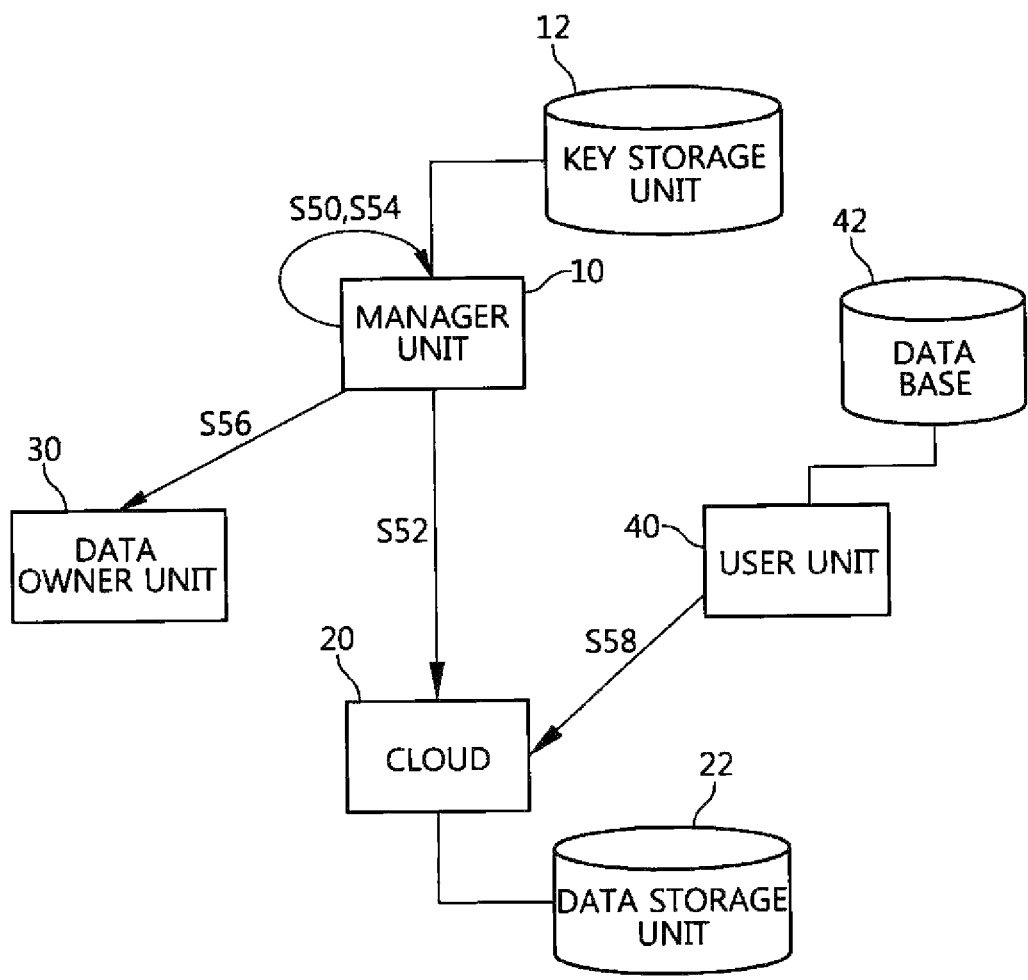
FIG. 5 is a diagram illustrating the flow of updating a key according to an embodiment of the present invention.

FIG. 5 is a diagram illustrating the flow of updating a key according, to an embodiment of the present invention. The flow of updating a key is viewed as being performed by the manager unit 10. That is, since the manager unit 10 can generate a DEK, it can update the generated DEK.

First, the manager unit 10 detects the occurrence of an event, such as a security policy (for example, the termination of the period of use of a DEK, or the like) and the revocation of a user, and starts to update the key at step S50.

In the case of the revocation of the user, the manager unit 10 registers a corresponding user ID$_r$, in a black list, and then obtains a DEK ID list, used by the corresponding user, via the key storage unit 12. The reason for this is to reject a request, which will be made by the user registered in the black list, via the manager unit 10. Alternatively, the manager unit 10 obtains a DEK ID list, which will be terminated, via the key storage unit 12. In this case, a DEK ID list to be updated is called KeyID$_r$, and r is called the exponents of updated target DEK IDs. The manager unit 10 generates a new DEK DEK$_r^{new}$ according to the above-described step S14, and obtains CT$_r^{new}$ by performing CP-ABE encryption using an access tree T$_r$ included in CT$_r^{old}$. Thereafter, the manager unit 10 stores CT$_r^{old}$, along with an existing CT$_r^{old}$, in KeyID$_r$. In this case, the manager unit 10 increases DEK version information V$_r$ included in the DEK encryption result value CT$_r^{new}$ by a specific value (for example, V$_r$=V$_r^{old}$+1).

Thereafter, the manager unit 10 accesses the cloud 20 using the updated DEK ID list KeyID$_r$. Thereafter, the manager unit 10 obtains all data encrypted with the DEKs of the corresponding DEK ID list at step S52.

Furthermore, the manager unit 10 obtains DEK$_r^{old}$ using a secret key SK$_m$, generated by it, in order to perform the CP-ABE decryption of the obtained encrypted data with respect to CT$_r^{old}$. The manager unit 10 decrypts (performs CP-ABE decryption on) the obtained encrypted data using the preceding DEK DEK$_r^{old}$, and performs data encryption using a new DEK$_r^{new}$ again. The data encrypted as described above is shared within the cloud 20 along with DEK version information V$_r$. The manager unit 10 may perform data re-encryption in a parallel manner. In particular, once the re-encryption of the data encrypted with the specific DEK$_r^{old}$ is completed, the manager unit 10 deletes the corresponding DEK$_r^{old}$, CT$_r^{old}$, and DEK$_r^{new}$ at step S54.

Thereafter, the manager unit 10 notifies the data owner unit 30, which is influenced by key update, of the updated DEK ID list KeyIDr using the data owner ID list being managed and the result $ID_{o=1,\ldots,n}$:$KeyID_x$ of the mapping of the DEK ID generated for the corresponding data owner unit 30 at step S56. This enables the data owner unit 30 to request the updated DEK from the manager unit 10 and use it when necessary in the future.

The user unit 40 obtains the result $KeyID_x$:$V_x^{local}$ of mapping between a DEK ID list previously used and currently being used and the version information of the individual DEKs via the database 42. Thereafter, the user unit 40 compares this with the DEK version information $V_x$ of the data combination with which the cloud 20 responded, and, when "$V_x > V_x^{local}$," determines that the DEK has been updated, requests the updated DEK key from the manager unit 10 and uses the updated DEK key at step S58.

According to at least one embodiment of the present invention configured as described above, the excessive computational load of a data owner, the changelessness of a DEK in the case of the revocation of a user, and the vulnerability of security attributable to a collusion attack, i.e., the limitations of KP-ABE or CP-ABE-based data access control in conventional cloud computing, can be overcome.

That is, a manager, i.e., a reliable entity, is allowed to perform the generation of a DEK and CP-ABE encryption and to manage the DEK by transferring access policy information, defined by a data owner, to the manager, so that a data owner can take the initiative in performing data access control and excessive computation can be delegated to the manager.

Furthermore, when an event, such as the revocation of a user or the termination of the period of use of a DEK, occurs, a manager updates a DEK itself and directly re-encrypts encrypted data within a cloud, which is influenced by corresponding DEKs, thereby providing high security and privacy protection for data stored in a cloud, compared to the conventional technology.

As described above, the optimum embodiments have been disclosed in the drawings and the specification. Although the specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true range of protection of the present invention should be defined based on the technical spirit of the attached, claims.

What is claimed is:

1. A data access control method in which a data owner unit, a manager unit and a cloud perform data access control in conjunction with one another in cloud computing, the method comprising:
    requesting, by the data owner unit, generation of a data encryption key (DEK) from the manager unit;
    generating, by the manager unit, the DEK;
    generating, by the manager unit, a result of Ciphertext Policy-Attribute Based Encryption (CP-ABE) of the DEK and, a secret key used to decrypt the result of the CPABE encryption, and then responding, by the manager unit, to the data owner unit;
    obtaining, by the data owner unit, the DEK by performing CP-ABE decryption of the result of the CP-ABE encryption using the secret key;
    encrypting, by the data owner unit, data with, the obtained DEK; and
    uploading, by the data owner unit, the encrypted data and DEK information to the cloud,
    wherein requesting the generation of the DEK from the manager unit comprises requesting the generation of the DEK by identification (ID) of the data owner unit to the manager unit.

2. The data access control method of claim 1, wherein responding to the data owner unit comprises:
    generating the result of the CP-ABE encryption, the secret key, and an ID of the DEK using an access tree related to access policy information; and
    providing the ID of the DEK, the result of the CP-ABE encryption, and the secret key to the data owner unit.

3. The data access control method of claim 2, wherein responding to the data owner unit comprises storing, by the manager unit, the ID of the data owner unit, the result of the CP-ABE encryption, and the ID of the DEK in a key storage unit.

4. The data access control method of claim 1, wherein requesting the generation of the DEK from the manager unit comprises, if access policies related to a previously generated DEK are intended to be changed, additionally including an ID of the DEK to be changed and transmitting the ID of the DEK to the manager unit.

5. The data access control method of claim 4, wherein the manager unit, when the ID of the DEK to be changed is received, generates a new access tree through changing of access policy information, and re-performs the CP-ABE encryption using the new access tree.

6. The data access control method of claim 5, wherein the manager unit stores the ID of the data owner unit, a result of the re-performance of the CP-ABE encryption, and the ID of the DEK in a key storage unit.

7. The data access control method of claim 1, wherein the DEK information comprises an identification (ID) of the DEK, and version information of the corresponding DEK included in the result of the CP-ABE re-encryption.

8. The data access control method of claim 1, further comprising, before requesting the generation of the DEK from the manager unit, generating, by the manager unit, a public key and a master key by performing a setup algorithm of CP-ABE.

9. The data access control method of claim 1, further comprising updating, by the manager unit, the DEK.

10. The data access control method of claim 9, wherein updating the DEK comprises:
    detecting a key update event;
    obtaining a key update target DEK ID list from a key storage unit;
    generating a new DEK based, on the DEK ID list;
    accessing the cloud, and obtaining encrypted data using a DEK of the DEK ID list;
    performing CP-ABE decryption of the encrypted data using the data encryption key existing before the new DEK, and encrypting the decrypted data using the new DEK; and
    uploading the encrypted data to the cloud.

11. The data access control method of claim 10, wherein the key update event is security policies or revocation of a user.

12. The data access control method of claim 11, wherein, when the key update event is the revocation of the user, obtaining the key update target DEK ID list comprises registering a corresponding user m a black list and then obtaining a DEK ID list, used by the corresponding user, from the key storage unit.

13. The data access control method of claim 11, further comprising, between generating the new DEK and obtaining the data encrypted using the DEK of the DEK ID list:

obtaining a result of new CP-ABE encryption by performing CP-ABE encryption of the new DEK; and updating DEK version information included in the result of the new CP-ABE encryption.

14. The data access control method of claim 13, wherein uploading the encrypted data to the cloud comprises uploading the updated DEK version information, together with the encrypted data.

15. The data access control method of claim 12, wherein updating the DEK further comprises notifying the data owner unit, which is influenced by the updating of the key, of an updated DEK ID list.

16. A data access control method in which a manager unit, a user unit and a cloud perform data access control in conjunction with one another in cloud computing, the method comprising;

accessing, by the user unit, the cloud, and obtaining, by the user unit, encrypted data to be accessed and DEK information including a DEK identification (ID):

requesting, by the user unit, a result of CP-ABE encryption of the DEK ID and a secret key used to decrypt the result of the CP-ABE encryption by transferring its ID and attribute set and the DEK ID included in the DEK information to the manager unit;

determining, by the manager unit, whether an attribute set of the user unit satisfies an access tree and an ID of the user unit is not included in a blacklist;

responding, by the manager unit, to the user unit with the secret key and a result of the CP-ABE encryption;

obtaining, by the user, unit, a DEK through CP-ABE decryption; and decrypting, by the user unit, the encrypted data with the DEK, wherein the DEK information comprises an ID of the DEK, and version information of the corresponding DEK included in the result of the CP-ABE encryption.

17. The data access control method of claim 16, wherein responding to the user unit with the secret key and the result of the CP-ABE encryption further comprises storing, by the manager unit, an ID of the user unit and the DEK ID in a key storage unit.

18. The data access control method of claim 16, wherein decrypting the encrypted data using the DEK further comprises storing, by the user unit, the DEK ID, used by the user unit, and version information of the corresponding DEK in a database.

\* \* \* \* \*